US012014916B2

(12) United States Patent
Quarmby et al.

(10) Patent No.: US 12,014,916 B2
(45) Date of Patent: Jun. 18, 2024

(54) AXIAL CI SOURCE—OFF-AXIS ELECTRON BEAM

(71) Applicant: Thermo Finnigan LLC, San Jose, CA (US)

(72) Inventors: Scott T. Quarmby, Round Rock, TX (US); Edward B. McCauley, Cedar Park, TX (US); George B. Guckenberger, Austin, TX (US)

(73) Assignee: Thermo Finnigan LLC, San Jose, CA (US)

(*) Notice: Subject to any disclaimer, the term of this patent is extended or adjusted under 35 U.S.C. 154(b) by 0 days.

(21) Appl. No.: 18/182,176

(22) Filed: Mar. 10, 2023

(65) Prior Publication Data

US 2023/0230826 A1 Jul. 20, 2023

Related U.S. Application Data

(62) Division of application No. 16/709,845, filed on Dec. 10, 2019, now abandoned.

(51) Int. Cl.
*H01J 49/14* (2006.01)
*H01J 49/06* (2006.01)
*H01J 49/26* (2006.01)

(52) U.S. Cl.
CPC .......... *H01J 49/147* (2013.01); *H01J 49/067* (2013.01); *H01J 49/26* (2013.01)

(58) Field of Classification Search
CPC ......... H01J 49/147; H01J 49/067; H01J 49/26
See application file for complete search history.

(56) References Cited

U.S. PATENT DOCUMENTS 3,377,502 A 4/1968 Kurt et al.
4,731,533 A 3/1988 Vestal
4,742,232 A * 5/1988 Biddle .................. H01J 27/022 315/111.41
4,749,910 A * 6/1988 Hara ........................ H01J 27/02 315/111.41
4,933,551 A * 6/1990 Bernius .................. H01J 27/028 250/288
4,988,869 A 1/1991 Aberth
5,101,105 A 3/1992 Fenselau et al.
5,365,070 A * 11/1994 Anderson ............. H01J 27/028 250/424
6,998,622 B1 2/2006 Wang et al.
9,105,454 B2 8/2015 Ristroph et al.
(Continued)

OTHER PUBLICATIONS

Kalvas, "Development and use of computational tools for modelling negative hydrogen ion source extraction systems", Dissertation, Department of Physics Research Report No. Oct. 2013, Jyvaskyla, University of Jyvaskyla, 2013, pp. 1-165.

*Primary Examiner* — Sean M Luck

(57) ABSTRACT

An ion source includes an electron generator, an ionization chamber, and a magnetic field. The electron generator is configured to produce electrons. The ionization chamber has an electron entrance aperture through a first wall, an ion exit aperture through a second wall, and an axis. The ionization chamber is configured to produce ions. The magnetic field is arranged to confine electrons in a beam directed through the electron entrance aperture, in a direction within 45 degrees of parallel to the axis, and towards a location displaced from the ion exit aperture.

7 Claims, 13 Drawing Sheets

(56) References Cited

U.S. PATENT DOCUMENTS

| | | | | |
|---|---|---|---|---|
| 9,117,617 | B2 | 8/2015 | Russ, IV et al. | |
| 9,721,777 | B1 | 8/2017 | Muntean | |
| 2005/0178955 | A1 | 8/2005 | Baba et al. | |
| 2005/0258354 | A1 | 11/2005 | Baba et al. | |
| 2006/0232368 | A1* | 10/2006 | Gorshkov .......... | G01R 33/3806<br>335/306 |
| 2007/0138386 | A1 | 6/2007 | Makarov et al. | |
| 2008/0116369 | A1 | 5/2008 | McCauley et al. | |
| 2011/0049347 | A1 | 3/2011 | Wells | |
| 2013/0277570 | A1 | 10/2013 | Park et al. | |
| 2015/0187557 | A1 | 7/2015 | Barofsky et al. | |
| 2016/0126076 | A1 | 5/2016 | Baba | |
| 2018/0068841 | A1 | 3/2018 | Wilton | |
| 2019/0287775 | A1 | 9/2019 | Newton et al. | |

* cited by examiner

AXIAL CI SOURCE—OFF-AXIS ELECTRON BEAM

CROSS REFERENCE TO RELATED APPLICATION

This application is a divisional of and claims, under 35 U.S.C § 120, the right of priority to co-pending and commonly-assigned U.S. patent application Ser. No. 16/709,845, titled "Axial CI Source—Off-Axis Electron Beam" and filed on Dec. 10, 2019, the disclosure of which is hereby incorporated by reference herein in its entirety.

FIELD

The present disclosure generally relates to the field of mass spectrometry including axial chemical ionization sources with an off-axis electron beam.

INTRODUCTION

Mass spectrometry can be used to perform detailed analyses on samples. Furthermore, mass spectrometry can provide both qualitative (is compound X present in the sample) and quantitative (how much of compound X is present in the sample) data for a large number of compounds in a sample. These capabilities have been used for a wide variety of analyses, such as to test for drug use, determine pesticide residues in food, monitor water quality, and the like.

Sensitivity of a mass spectrometer can be limited by the efficiency of the ion source, ion losses through the mass spectrometer and in the mass analyzer, and sensitivity of the detector. Increasing the efficiency of the ion source, the number of ions produced per unit sample or per unit time, can significantly improve the detection limits of the mass spectrometer, enabling the detection of lower concentrations of compounds or the use of smaller amounts of sample. Additionally, increasing the stability of the ion source, number of ions produced as a function of time, is important for quantitative comparisons between runs and samples. As such, there is a need for improved ion sources.

SUMMARY

In a first aspect, an ion source can include an electron generator, an ionization chamber, a magnetic field, and an ion optic. The electron generator can be configured to produce electrons. The ionization chamber can have an electron entrance aperture through a first wall, an ion exit aperture through a second wall, and an axis. The ionization chamber can be configured to produce ions. The magnetic field can be arranged to confine electrons in a beam directed through the electron entrance aperture, in a direction within 45 degrees of parallel to the axis, and towards a location displaced from the ion exit aperture. The ion optic can be configured to direct ions exiting the ion exit aperture in an ion beam along the axis.

In various embodiments of the first aspect, the ionization chamber can be configured to produce ions by chemical ionization.

In various embodiments of the first aspect, the location can be on the second wall.

In various embodiments of the first aspect, the electron beam can be parallel to the axis but offset from the ion beam in a direction orthogonal to the axis.

In various embodiments of the first aspect, the electron beam can intersect a line along the direction of the ion beam.

In various embodiments of the first aspect, the ionization chamber can further includes a recess on the second wall and displaced from the ion exit aperture, and the electron beam can be directed towards the recess.

In various embodiments of the first aspect, a mass spectrometer can include an ion source of the first aspect, and a mass analyzer.

In a second aspect, a method can include generating electrons; directing electrons in a beam through an electron entrance aperture through a first wall of an ionization chamber and towards a location displaced from an ion exit aperture through a second wall of the ionization chamber, and in a direction within 45 degrees of parallel to an axis of the ionization chamber; producing ions within the ionization chamber; and directing ions as a beam through the ion exit aperture and in a direction parallel to the axis of the ionization chamber.

In various embodiments of the second aspect, producing ions within the ionization chamber can include producing ions by chemical ionization.

In various embodiments of the second aspect, the location can be on the second wall.

In various embodiments of the second aspect, directing the electron beam can include directing the electron beam in a direction parallel to the axis but offset from the ion beam in a direction orthogonal to the axis.

In various embodiments of the second aspect, directing the electron beam can include directing the electron beam to intersect a line along the direction of the ion beam.

In various embodiments of the second aspect, directing the electron beam can include directing the electron beam towards a recess on the second wall of the ionization chamber and displaced from the ion exit aperture.

In a third aspect, an ion source can include an electron generator, an ionization chamber, a magnetic field, and an electron dispersive mechanism. The electron generator can be configured to produce electrons. The ionization chamber can have an electron entrance aperture through a first wall and an ion exit aperture through a second wall. The ionization chamber can be configured to produce ions. The magnetic field can be arranged to confine electrons in a beam directed through the electron entrance aperture. The electron dispersive mechanism can be configured to disperse the electrons within the ionization chamber.

In various embodiments of the third aspect, the ionization chamber can be configured to produce ions by chemical ionization.

In various embodiments of the third aspect, the first wall and the second wall can be opposite from one another.

In various embodiments of the third aspect, the electron dispersive mechanism can include a magnetic shielding configured to reduce the magnetic fields within at least a portion of the ionization chamber.

In various embodiments of the third aspect, the electron dispersive mechanism can include one or more additional magnets oriented to disrupt the magnetic field within at least one part of the ionization chamber.

In various embodiments of the third aspect, the electron dispersive mechanism can include an electrostatic lens can be configured to direct electrons away from the ion exit aperture without substantially affecting the ion beam.

In various embodiments of the third aspect, a mass spectrometer can include an ion source of third aspect and a mass analyzer.

In a fourth aspect, a method can include generating electrons; directing electrons in a beam through an electron entrance aperture of an ionization chamber; dispersing the electrons within the ionization chamber; producing ions within the ionization chamber; and directing the ions as a beam through the ion exit aperture.

In various embodiments of the fourth aspect, producing ions within the ionization chamber can includes producing ions by chemical ionization.

DRAWINGS

For a more complete understanding of the principles disclosed herein, and the advantages thereof, reference is now made to the following descriptions taken in conjunction with the accompanying drawings and exhibits, in which.

Figure 1:
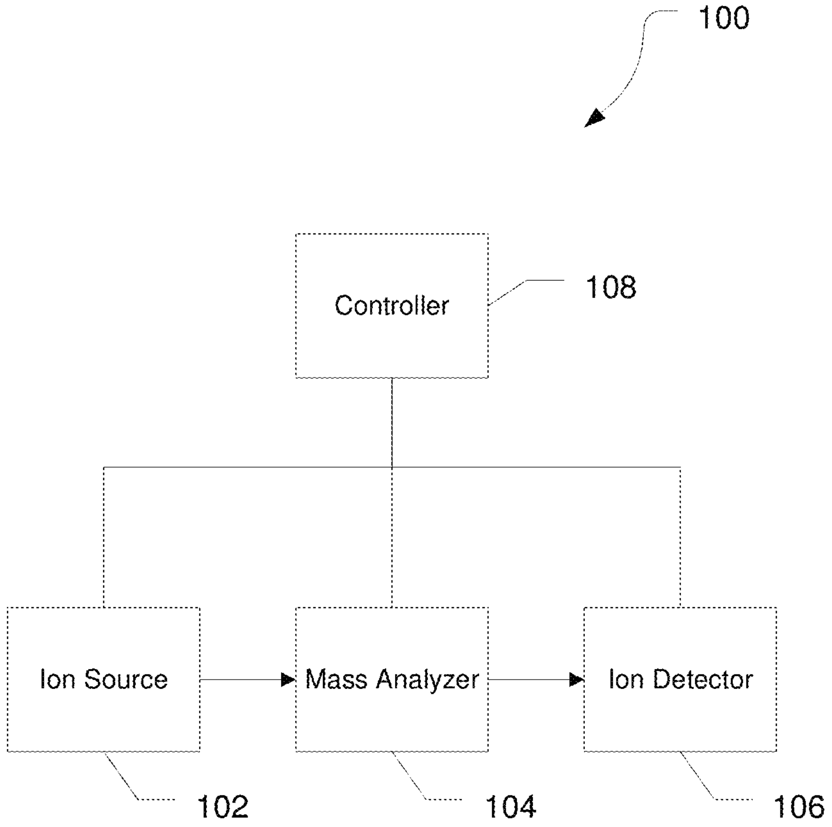
FIG. 1 is a block diagram of an exemplary mass spectrometry system, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for ion isolation are described herein and in the accompanying exhibits.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Mass Spectrometry Platforms

Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, a mass analyzer 104, an ion detector 106, and a controller 108.

In various embodiments, the ion source 102 generates a plurality of ions from a sample. The ion source can include, but is not limited to electron ionization source, chemical ionization (CI) source, or a combination thereof.

In various embodiments, the mass analyzer 104 can separate ions based on a mass to charge ratio of the ions. For example, the mass analyzer 104 can include a quadrupole mass filter analyzer, a quadrupole ion trap analyzer, a time-of-flight (TOF) analyzer, an electrostatic trap (e.g., ORBITRAP) mass analyzer, Fourier transform ion cyclotron resonance (FT-ICR) mass analyzer, and the like. In various embodiments, the mass analyzer 104 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio.

In various embodiments, the ion detector 106 can detect ions. For example, the ion detector 106 can include an electron multiplier, a photo multiplier, an avalanche diode, a silicon photomultiplier, a Faraday cup, and the like. Ions leaving the mass analyzer can be detected by the ion detector. In various embodiments, the ion detector can be quantitative, such that an accurate count of the ions can be determined. In various embodiments, such as when using an electrostatic mass analyzer, the functions of mass analyzer 104 and ion detector 106 can be performed by the same component.

In various embodiments, the controller 108 can communicate with the ion source 102, the mass analyzer 104, and the ion detector 106. For example, the controller 108 can configure the ion source or enable/disable the ion source. Additionally, the controller 108 can configure the mass analyzer 104 to select a particular mass range to detect. Further, the controller 108 can adjust the sensitivity of the ion detector 106, such as by adjusting the gain. Additionally, the controller 108 can adjust the polarity of the ion detector 106 based on the polarity of the ions being detected. For example, the ion detector 106 can be configured to detect positive ions or be configured to detected negative ions.

Ion Source

Figure 2A:
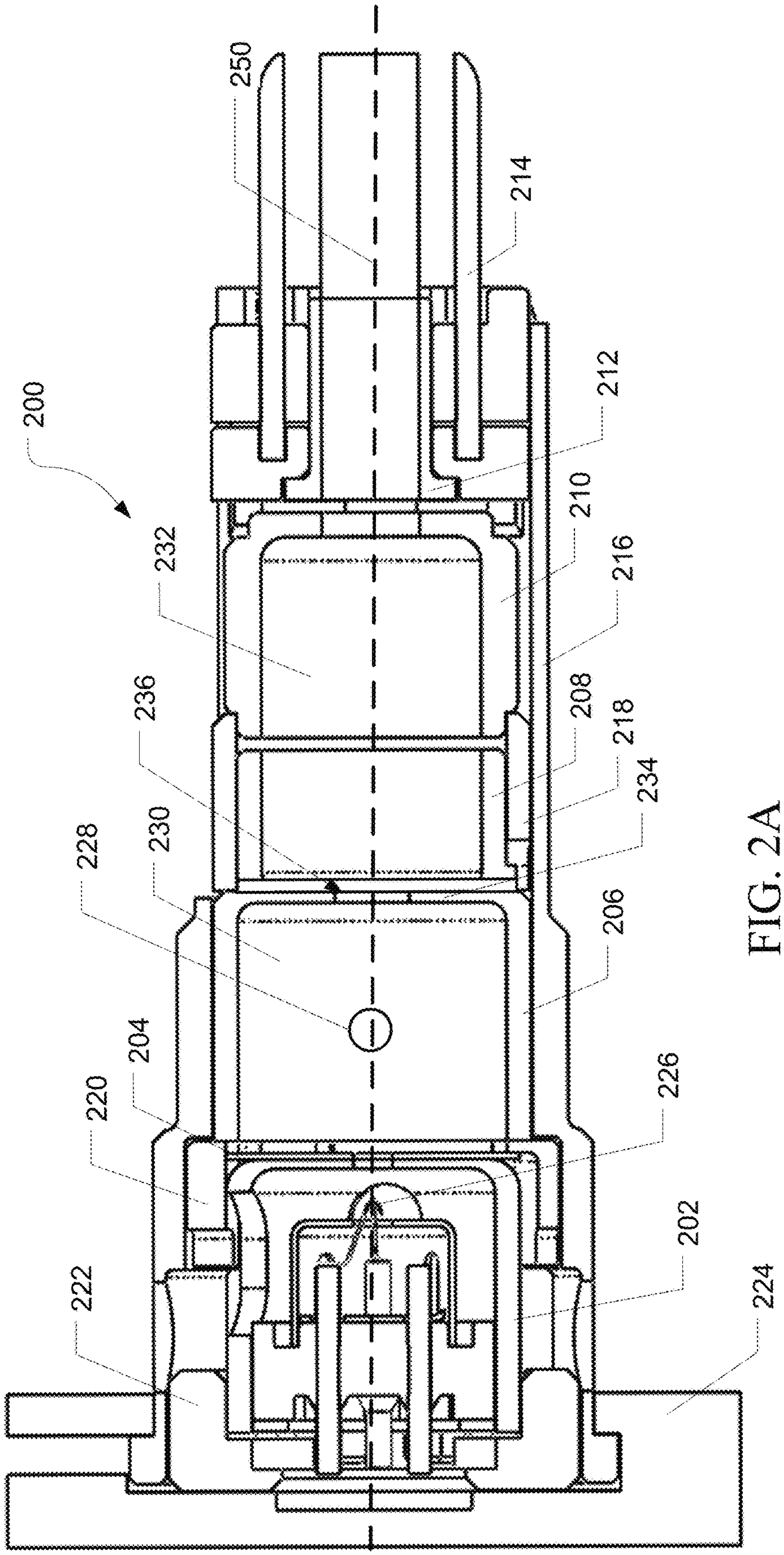
FIGS. 2A and 2B are diagrams illustrating an exemplary ion source, in accordance with various embodiments.
Figure 2B:
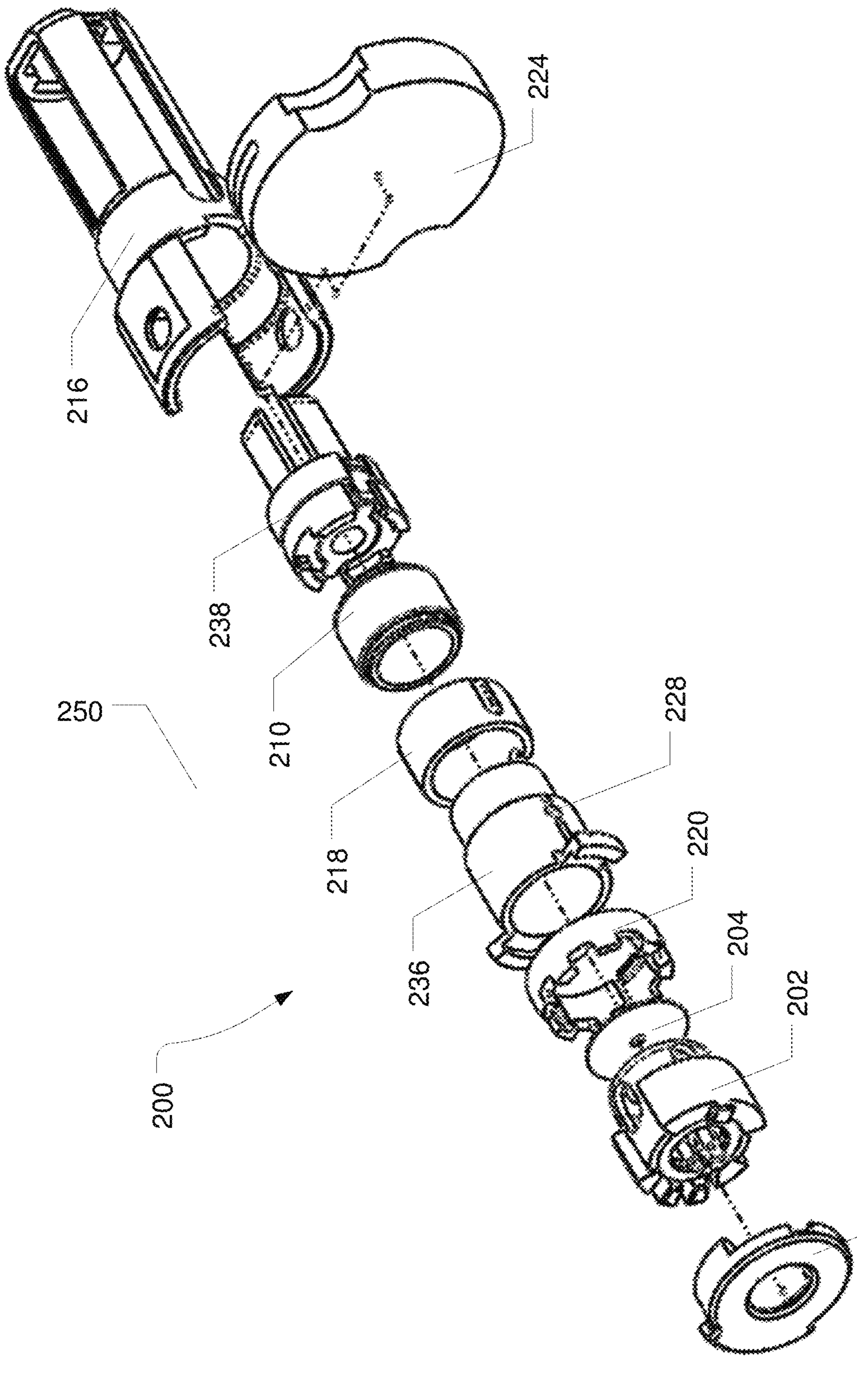

FIGS. 2A and 2B are diagrams illustrating an ion source 200, which can be used as ion source 102 of mass spectrometry platform 100. Ion source 200 can include an electron source 202, an electron lens 204, an ionization chamber 206, lens elements 208, 210, and 212, and RF ion guide 214. Additionally, ion source 200 can include a body 216, insulator 218, spacers 220 and 222, and retaining clip 224. In various embodiments, the ionization chamber 206, lens elements 208, 210, and 212, and RF ion guide 214 can be aligned such that ions produced by the ion source form an ion beam. The alignment of the ionization chamber 206, lens elements 208, 210, and 212, and RF ion guide 214 and the direction of the ion beam defines an axis 250 of the ion source.

Electron source 202 can include a thermionic filament 226 for the generation of electrons. In various embodiments, electron source 202 can include more additional thermionic filaments for redundancy or increased electron production. In alternate embodiments, electron source 202 can include a field emitter, electron multiplier, photoelectric effect emitter, or other source of electrons. The electrons can travel axially along ion source 200 into ionization chamber 206 to ionize gas molecules. Electron lens 204 can serve to prevent the ions from traveling back towards the electron source.

Ionization chamber 206 can include gas inlet 228 for directing a gas sample into an ionization volume 230 defined by the ionization chamber 206. Gas molecules within the ionization volume 230 can be ionized by the electrons from the thermionic filament 226. Lenses 208 and 210 can define a lens volume 232. Lens volume 232 can include regions of the lenses where some electrons may be present. In various embodiments, it may also include areas outside of the ionization volume and the lenses. Wall 234 can restrict the flow of gas from ionization volume 230 to the lens volume 232, creating a substantial pressure difference between the ionization volume 230 and lens volume 232. Ion exit aperture 236 can provide a path through wall 234 for ions to exit the ionization chamber 206.

In various embodiments, the ionization chamber 206 and lens element 208 can be joined to create an extended ionization element 240 defining the ionization volume 230 and at least a portion of the lens volume 232. In such embodiments, lens element 208 can be electrically coupled to ionization chamber 206. In other embodiments, the joined ionization chamber 206 and lens element 208 can be electrically isolated, such that different voltage potentials can be applied to the ionization chamber 206 and the lens element 208.

Lens 210 and 212 and RF ion guide 214 can assist in the axial movement of ions from the ionization volume 230 to additional ion optical elements and mass analyzer 104 of mass spectrometry platform 100. In various embodiments, ion guide assembly 238 can include lens 212 and RF ion guide 214. Ion guide assembly 238 can include additional insulating portions to electrically isolate lens 212 from RF ion guide 214. Additionally, the insulating portions can include standoffs to prevent electrical contact between lens 210 and lens 212.

When assembled into body 216, insulator 218 can prevent electrical contact between lens 208 (or extended ionization element 240) and lens 210. Spacer 220 can prevent electrical contact between electron lens 204 and ionization chamber 208 (or extended ionization element 240). Spacer 222 can be indexed to prevent rotation of the electron source 202, and retaining clip 224 can hold the other components within body 216.

Figure 3A:
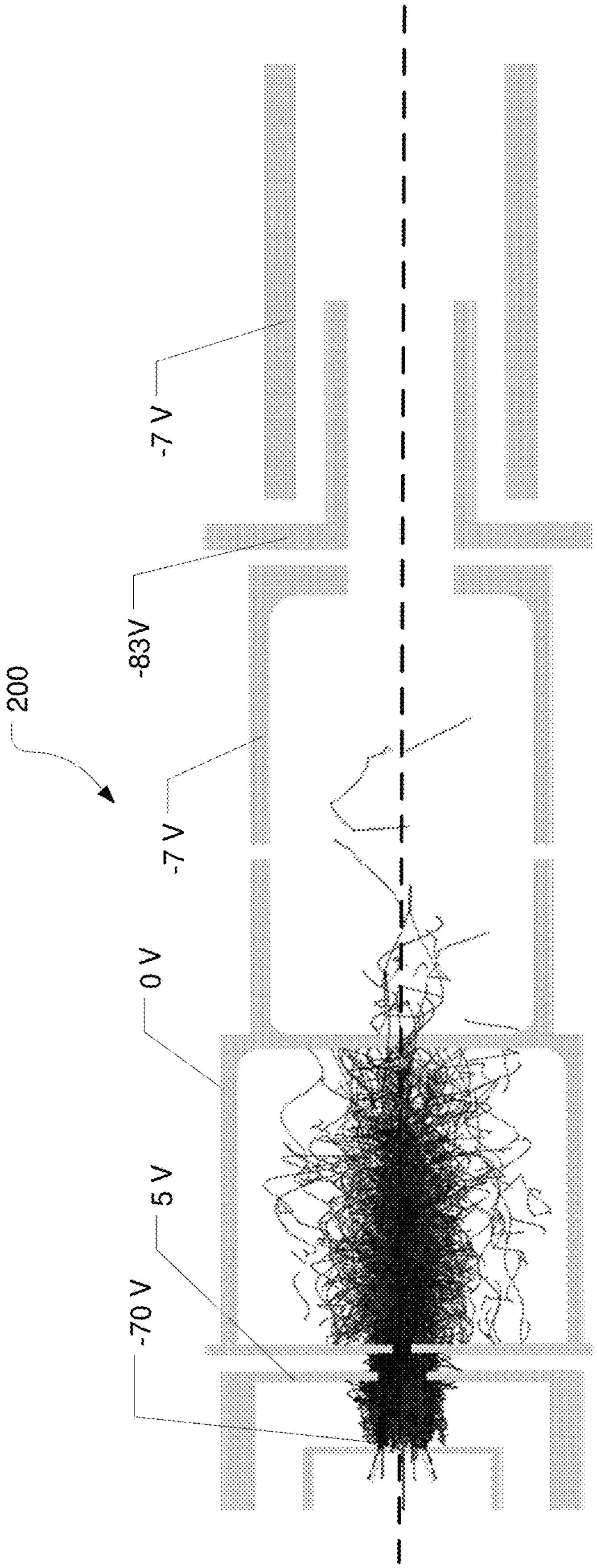
FIGS. 3A and 3B are diagrams illustrating simulations of electrons in an ion source, in accordance with various embodiments.

FIG. 3A is an illustration of a simulation of electrons in ion source 200 using positive chemical ionization (CI). Potentials used for the simulation are shown in FIG. 3A and Table 1. In positive CI, the ionizing electrons form reagent ions in the ionization volume. These reagent ions then interact with the analyte neutrals to form positive analyte ions.

TABLE 1

| Positive Chemical Ionization | |
|---|---|
| | Simulation |
| Filament 226 | −70 V |
| Electron Lens 204 | 5 V |
| Ionization Chamber 206 | 0 V (grounded) |
| Lens 208 | 0 V (grounded) |
| Lens 210 | −7 V |
| Lens 212 | −83 V |
| RF Ion Guide 214 | −7 V |

In ion source 200, electrons can be on axis 250 with the ion beam. This can have the advantage of using the negative space charge from the electron beam to focus positive ions to the center axis 250. Additionally, a negatively charged ion exit aperture can help extract positive ions. These features can also be beneficial when used for positive CI.

Figure 3B:
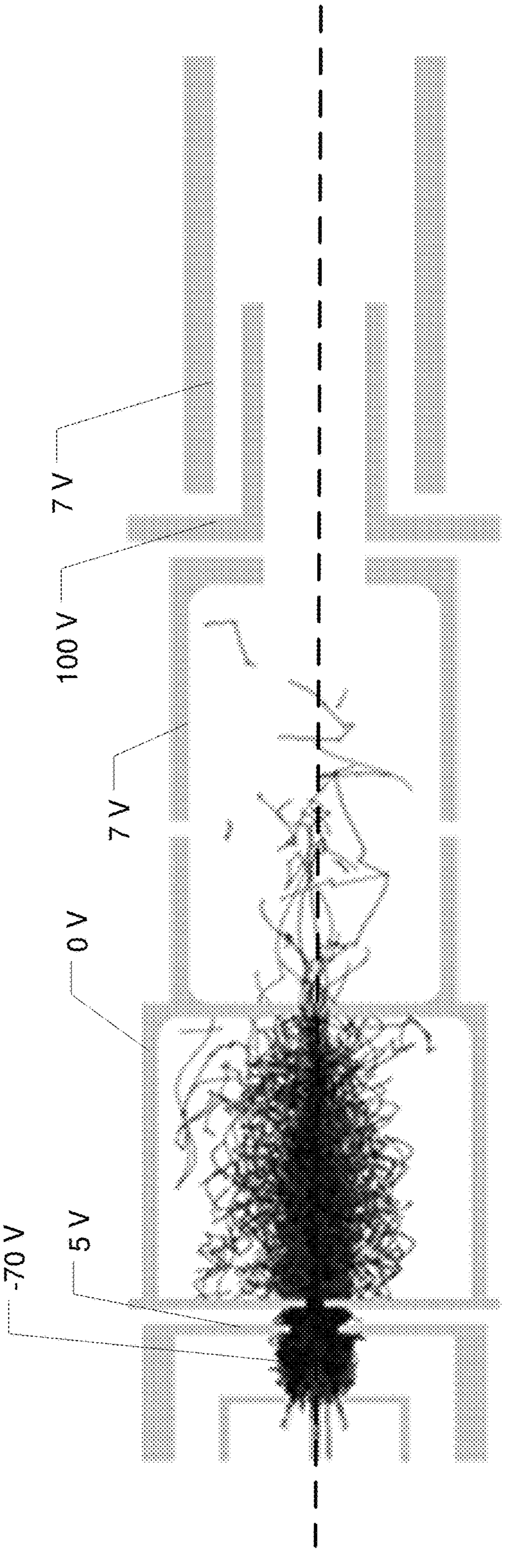

FIG. 3B is an illustration of a simulation of electrons in ion source 200 performing negative CI. Potentials used for the simulation are shown in FIG. 3B and Table 2. In negative CI, the ionizing electrons can form reagent ions in the ionization volume. The outer shell electrons released during this ionization can be at thermal energies. The ionizing electrons can also lose kinetic energy as they collide with the reagent gas. Ultimately, the ionizing electrons can lose kinetic and reach thermal energies. These various thermal energy electrons can then interact with the analyte neutrals and can be captured to produce negative analyte ions.

Electrons striking the area around ion exit aperture 236 can result in the accumulation of an insulating layer around the ion exit aperture, changing the potential to close to that of the electrons, −70 V. In various embodiments, neutral molecules from the analyte of matrix can temporarily land on the surfaces of the ionization chamber 206. The molecules will generally leave the surface. However, if electrons strike the neutral molecules while on the surface, they can become attached to the surface in the form of inorganic carbon, silicon dioxide, or other insulating material depending on the composition of the molecule. This can form an insulating layer on the surface of the metal. As charged particles, such as electrons, strike the insulating layer, their charge cannot be quickly dissipated by the underlying metal and instead a charge can accumulate on the insulating layer. Once that occurs, the ion exit aperture can become a barrier to the electrons and the negative ions. This reduces the number of negative ions which leave the ionization volume 230 and travel to the ion detector 106 to be detected.

TABLE 2

| Negative Chemical Ionization | |
|---|---|
| | Simulation |
| Filament 226 | −70 V |
| Electron Lens 204 | +5 V |
| Ionization Chamber 206 | 0 V (grounded) |
| Lens 208 | 0 V (grounded) |
| Lens 210 | +7 V |
| Lens 212 | +100 V |
| RF Ion Guide 214 | +7 V |

Modified Geometries

For CI, there is no inherent reason the electrons need to be on the same axis as the ions. By modifying the ion source geometry so the ion beam does not strike the exit aperture from the ionization chamber, charging near the aperture can be reduced.

Figure 4:
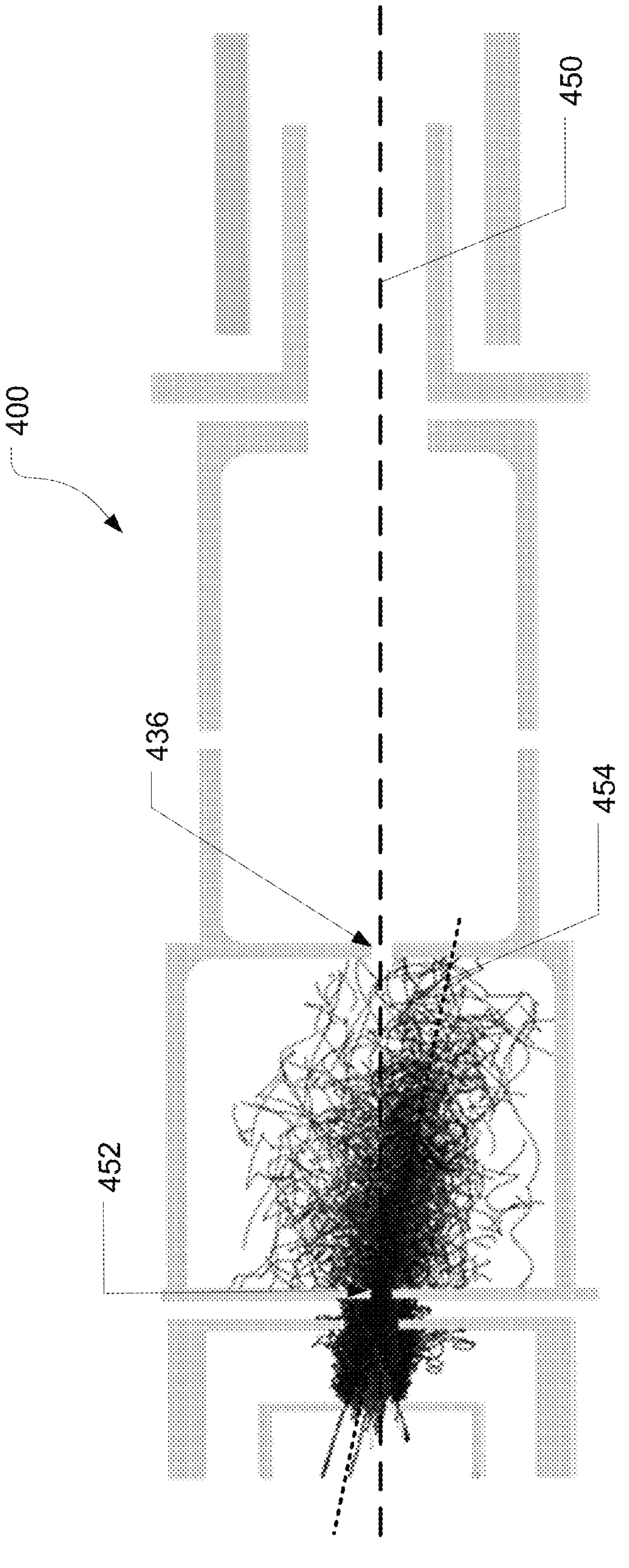
FIG. 4 is a diagram illustrating simulations of electrons in an ion source with an off axis magnetic field, in accordance with various embodiments.

FIG. 4 is an illustration of a simulation of electrons in ion source 400 performing negative ion chemical ionization. In ion source 400, the magnetic field is shifted off-axis which directs the electron beam at an angle relative to the axis 450 of the ion 400 source. In various embodiments, the magnetic field can be produced by a magnet, such as permanent magnet or an electromagnet, placed at one end of ion source, by a solenoid oriented around the ion source 400, or other known techniques known for producing magnetic fields. Additionally, the electron entrance aperture 452 can be shifted to align with the electron beam 454 rather than the ion source axis 450. In an exemplary embodiment, shifting the magnetic field by 4 mm and the aperture by 0.4 mm can direct the electrons away from the ion exit aperture 436. By also shifting the electron entrance aperture 452, nearly the same number of electrons are able to reach the ionization volume.

Figure 5A:
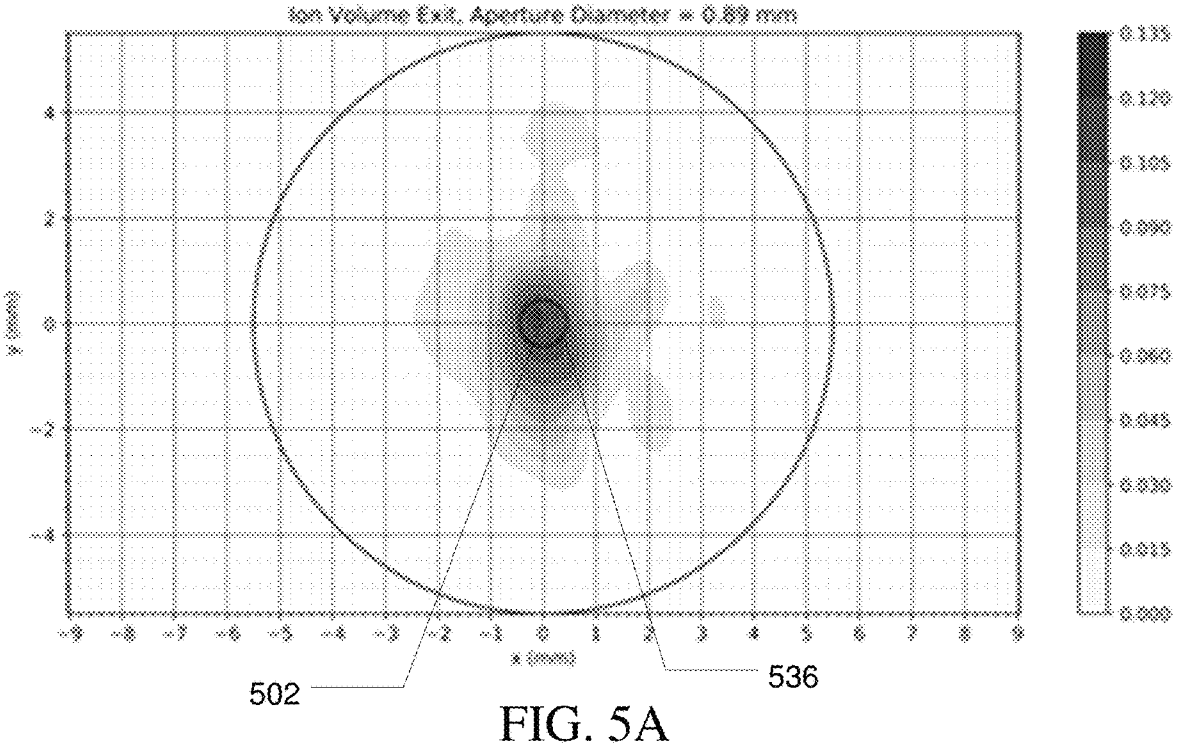
FIGS. 5A and 5B are diagrams illustrating electron impact density at the ion exit aperture, in accordance with various embodiments.
Figure 5B:
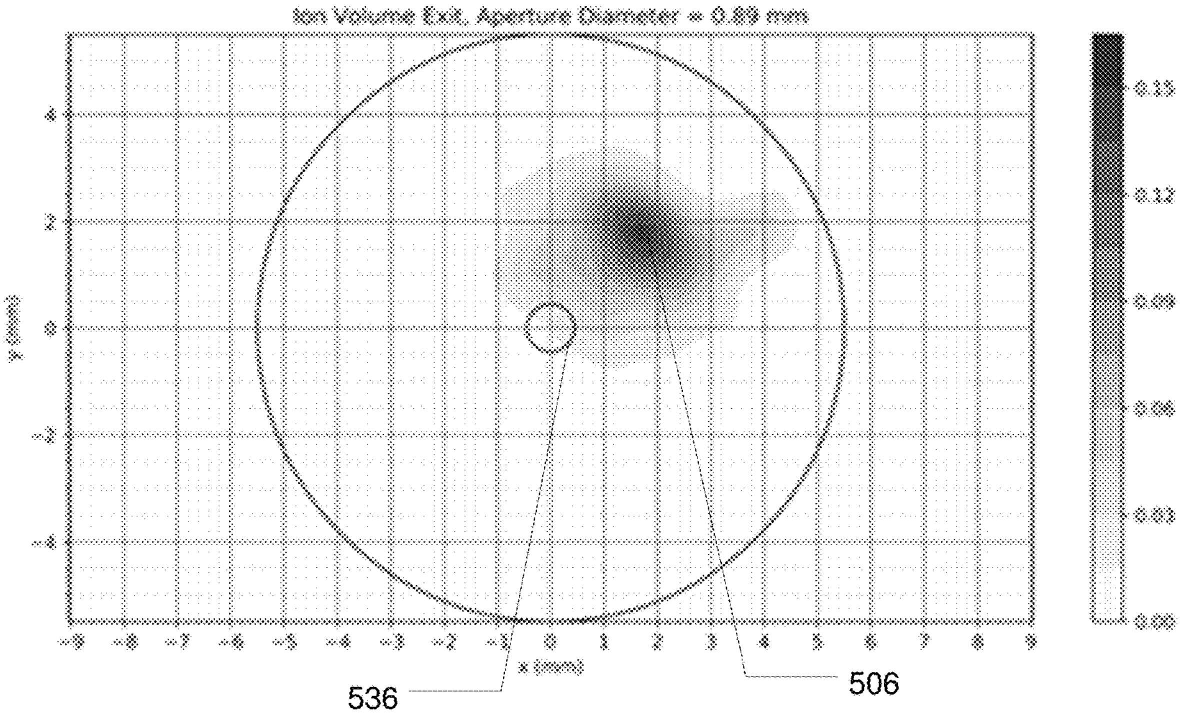

FIG. 5A illustrates the distribution of electrons striking the surface around the ion exit aperture 536 with the electron beam aligned with the ion source axis. The highest density of electrons 502 (indicated by the darkest color) is in the immediate vicinity of the ion exit aperture 536. In contrast, FIG. 5B illustrates the distribution of electrons when the magnetic field and electron entrance aperture are shifted to direct the electrons away from the ion exit aperture 536. The highest density of electrons 506 is displaced from the ion exit aperture 536, and the accumulation of an insulating layer around the ion exit aperture 536 can be reduced. This reduces the amount of charging near the ion exit aperture 536 and increases the number of analyte ions which are able to exit the ionization chamber 206.

Figure 6:
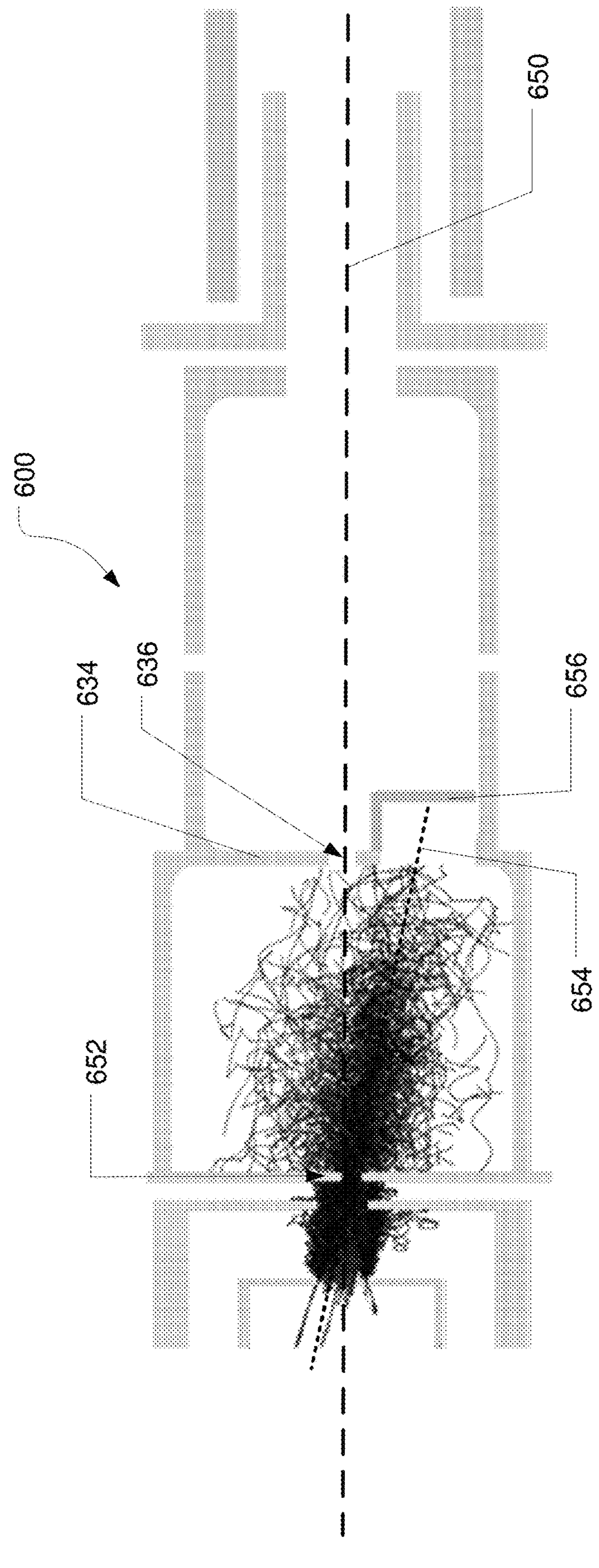
FIG. 6 is a diagram illustrating a simulation of electrons in an ion source with an off axis magnetic field and a pocket for the electron beam, in accordance with various embodiments.

FIG. 6 is an illustration of an ion source 600 for performing negative ion chemical ionization. In ion source 600, the magnetic field is shifted off-axis which directs the electron beam 654 at an angle relative to the axis 650 of the ion source 600. Additionally, the electron entrance aperture 652 can be shifted to align with the electron beam 654 rather than the ion source axis 650. Additionally, a dimple, well, or pocket 656 is formed in wall 634 allowing the electron beam a greater distance of travel and moving the region of on highest electron impact density further away from the ion exit aperture 636.

Figure 7:
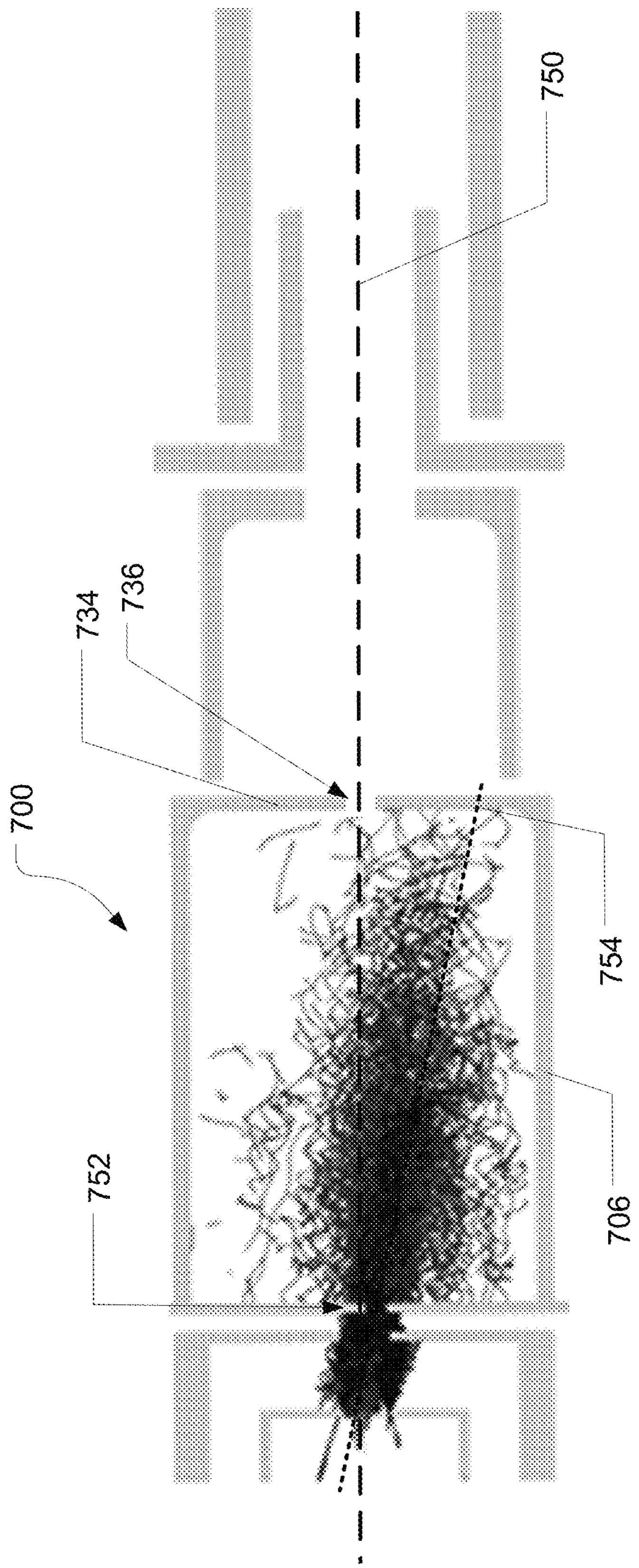
FIG. 7 is a diagram illustrating a simulation of electrons in an ion source with an off axis magnetic field and an extended ionization chamber, in accordance with various embodiments.

FIG. 7 is an illustration of an ion source 700 for performing negative ion chemical ionization. In ion source 700, the magnetic field is shifted off-axis which directs the electron beam 754 at an angle relative to the axis 750 of the ion source 700. Additionally, the electron entrance aperture 752 can be shifted to align with the electron beam 754 rather than the ion source axis 750. Additionally, the length of the ionization chamber 706 is extended by an additional 5.8 mm, allowing the electron beam 754 a greater distance of travel and moving the region of on highest electron impact density further away from the ion exit aperture 736. In various embodiments, the length of the ionization chamber 706 can be extended by more or less than 5.8 mm to achieve sufficient separation between the region of highest electron impact density and the ion exit aperture 736.

Figure 8:
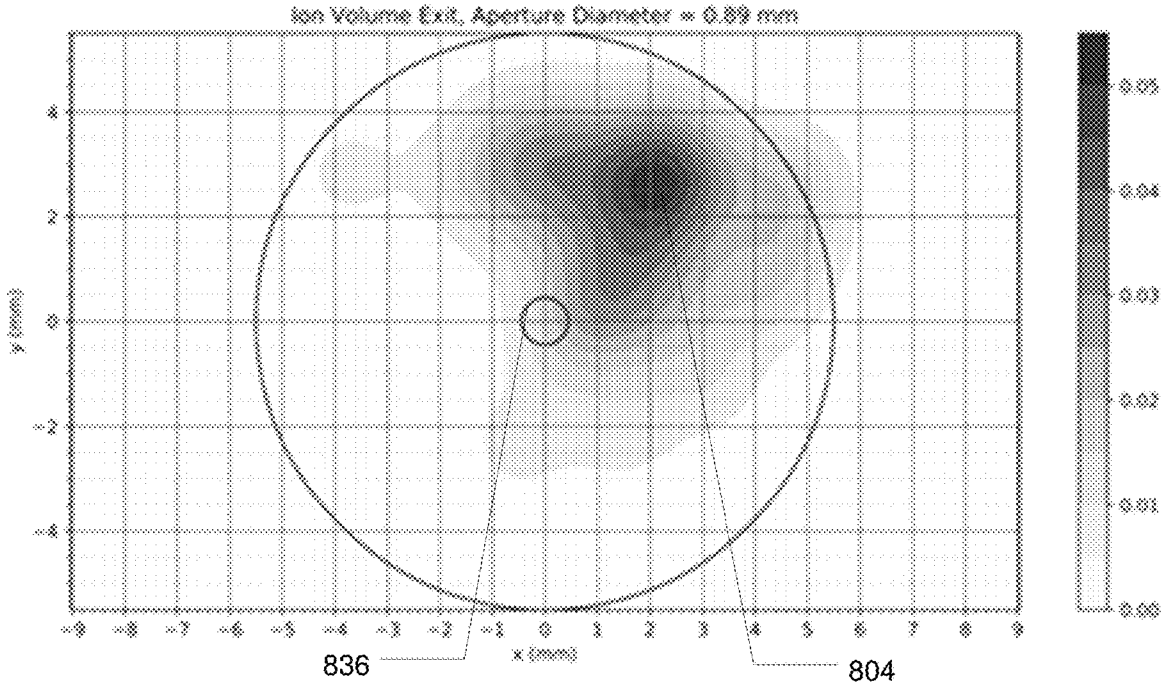
FIG. 8 is a diagram illustrating electron impact density at the ion exit aperture, in accordance with various embodiments.

FIG. 8A illustrates the distribution of electrons when the magnetic field and electron entrance aperture are shifted to direct the electrons away from the ion exit aperture 836 and the ionization volume length is extended. Comparing to FIG. 5B, the highest density of electrons 802 is even further displaced from the ion exit aperture 836 and the electrons are distributed over a larger area, and further reducing the accumulation of an insulating layer around the ion exit aperture 836.

Figure 9:
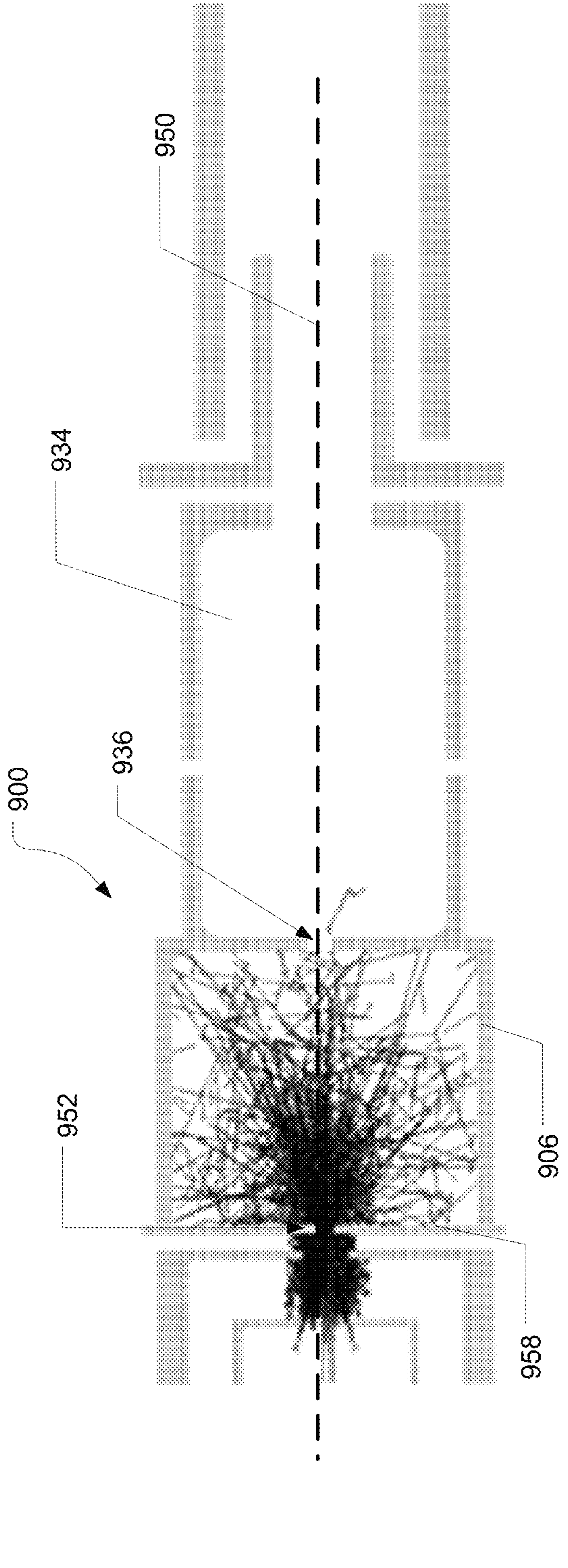
FIG. 9 is a diagram illustrating a simulation of electrons in an ion source with an electron dispersive mechanism, in accordance with various embodiments.

FIG. 9 is an illustration of an ion source 900 for performing negative ion chemical ionization. In ion source 900, the electrons can be dispersed using an electron dispersive mechanism. In various embodiments, the electron dispersive mechanism can include reducing or eliminating the magnetic field inside the ionization chamber 906, such as by making the ionization chamber 906 from MuMetal or adding a layer of MuMetal between the electron source and the ionization chamber 906, such as the wall shown by 958. The simulation shows an ideal scenario where there is no magnetic field inside the ionization chamber 906. Without the magnetic field to contain the electrons, electron to electron space charge can make the electrons spread out. In other embodiments, additional magnets can be positioned to cancel out the magnetic fields within the ionization chamber or to make the magnetic fields dispersive to electrons rather than containing the electrons. In yet other embodiments, the electrons can be dispersed electrostatically, such as by using a lens to direct electrons away from the ion exit aperture without substantially affecting the ion beam.

Figure 10:
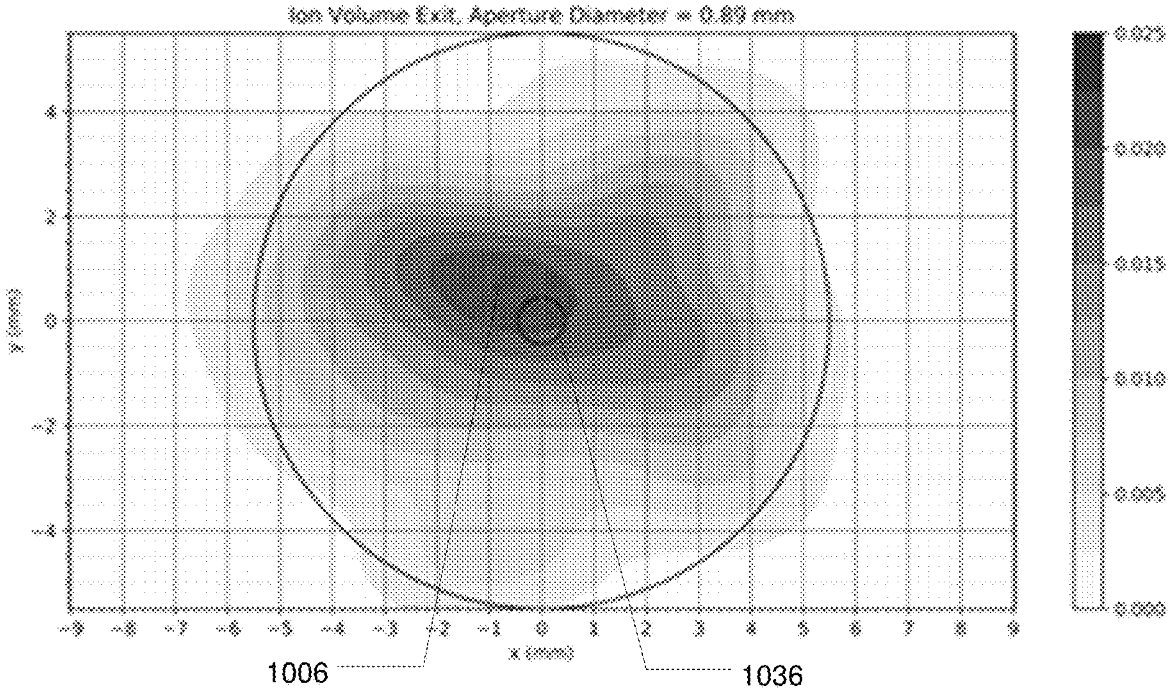
FIG. 10 is a diagram illustrating electron impact density at the ion exit aperture, in accordance with various embodiments.

FIG. 10 illustrates the distribution of electrons when the magnetic field inside the ionization chamber is reduced. The electrons are less focused and more evenly distributed over a larger area. Although many electrons still strike the area around the ion exit aperture 1036, they are more spread out and accumulation of an insulating layer around the ion exit aperture 1036 can be reduced.

Figure 11:
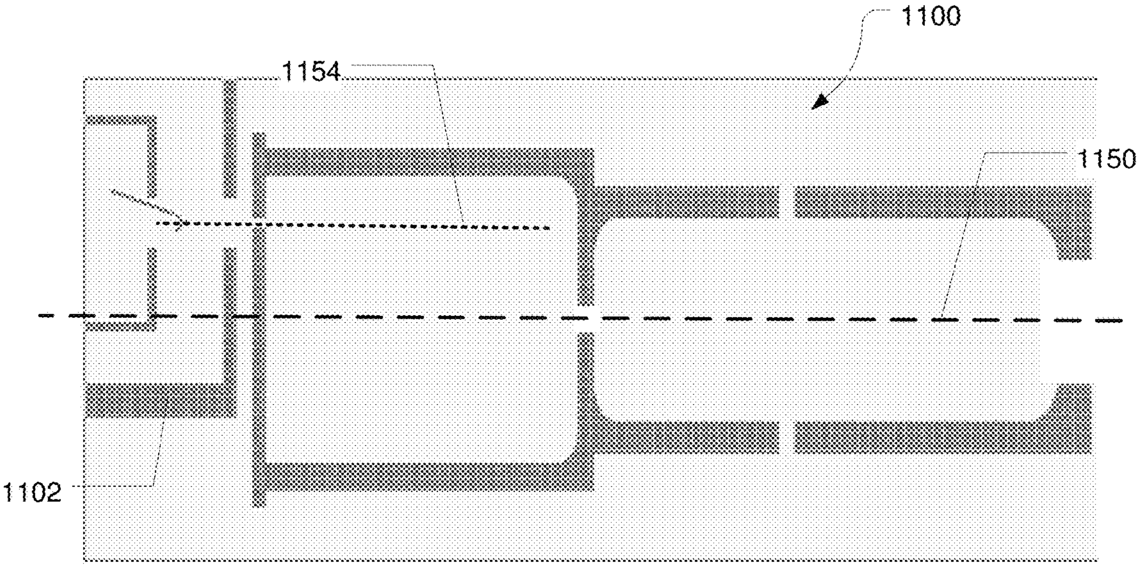
FIGS. 11 and 12 are a diagrams illustrating ion sources with off-axis electron sources, in accordance with various embodiments.

FIG. 11 is an illustration of an ion source 1100 for performing negative ion chemical ionization. In ion source 1100, the electron source 1102 and magnetic field can be shifted relative to the axis 1150 of ion source 1100. In various embodiments, the electron beam 1154 can be parallel but offset from the axis 1150 of the ion source 1100. In other embodiments, the electron beam 1154 may not be parallel but can be generally offset from the axis 1150.

Figure 12:
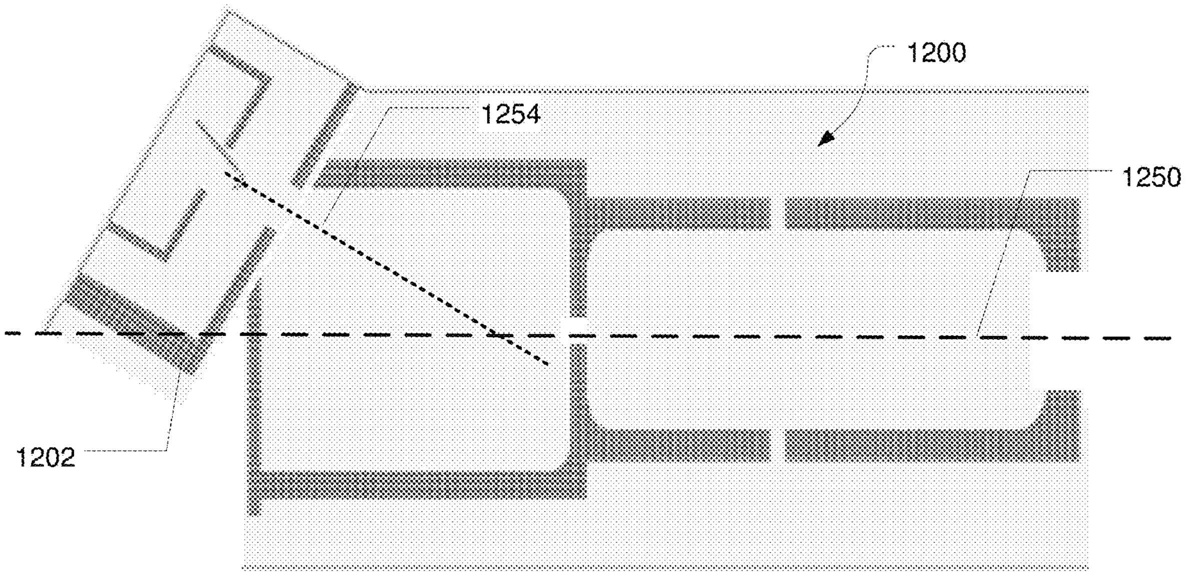

FIG. 12 is an illustration of an ion source 1200 for performing negative ion chemical ionization. In ion source 1200, the electron source 1202 and magnetic field can be shifted relative to the axis 1250 of ion source 1200 and can be angled to align with the electron beam 1254. In various embodiments, the electron beam 1254 can be angled relative to the axis 1250 of the ion source 1200, such as by less than 45°. In various embodiments, the electron beam 1254 can intersect the axis 1250 or the electron beam 1254 and the axis 1250 can be skew.

Figure 13:
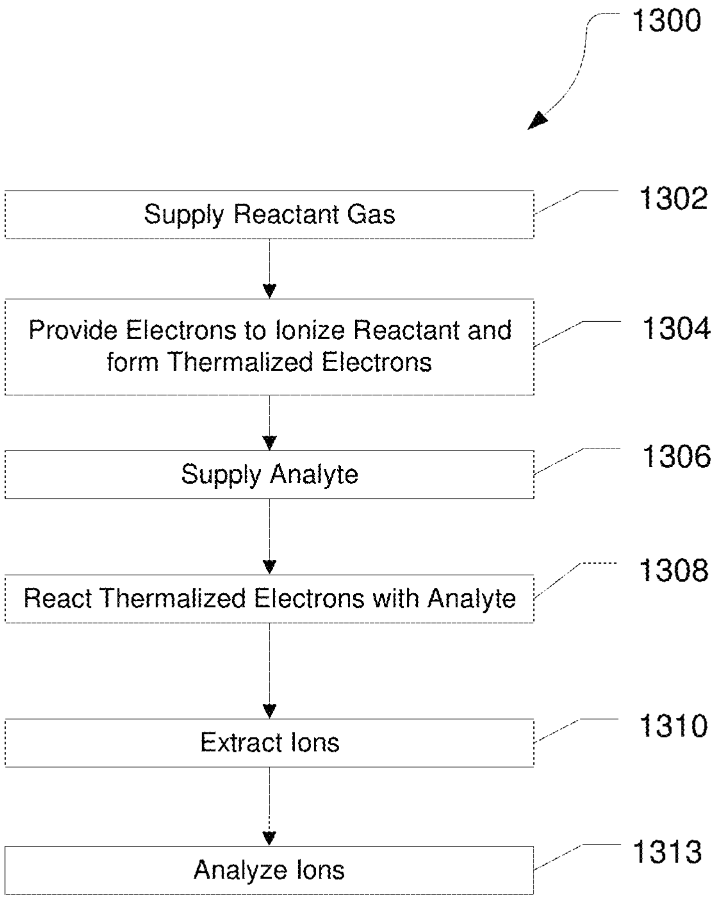
FIG. 13 is a flow diagram illustrating an exemplary method of operating an ion source, in accordance with various embodiments.

FIG. 13 illustrates a method 1300 of generating negative ions using chemical ionization. At 1302, a reactant gas can be supplied into the ionization chamber of the ion source. At 1304, electrons can be introduced into the ionization chamber to ionize the reactant gas and produce thermalized electrons. The thermalized electrons can include electrons ejected from outer electron shell when the reactant gas (or carrier gas) is ionized and electrons from the electron beam that are slowed or cooled by collisions with the reactant gas (and the carrier gas). At 1306, the neutral analyte can be introduced into the ionization chamber. At 1308, the thermalized electrons can react with and be captured by the neutral analyte to produce negative analyte ions. At 1310, the ions can be extracted from the ionization chamber, and at 1313, the ions can be analyzed.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

The embodiments described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The embodiments, described herein, also relate to a device or an apparatus for performing these operations. The systems and methods described herein can be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

What is claimed is:

1. An ion source comprising:

an electron generator configured to produce electrons;

an ionization chamber having an electron entrance aperture through a first wall and an ion exit aperture through a second wall, the ionization chamber configured to produce ions;

a magnetic field arranged to confine electrons in a beam directed through the electron entrance aperture;

an electron dispersive mechanism configured to disperse the electrons within the ionization chamber, the electron dispersive mechanism including a magnetic shielding configured to reduce the magnetic fields within at least a portion of the ionization chamber.

2. The ion source of claim 1 wherein the ionization chamber is configured to produce ions by chemical ionization.

3. The ion source of claim 1 wherein the first wall and the second wall are opposite from one another.

4. The ion source of claim 1 wherein the electron dispersive mechanism includes an electrostatic lens configured to direct electrons away from the ion exit aperture without substantially affecting the ion beam.

5. A mass spectrometer comprising:

an ion source of claim 1; and a mass analyzer.

6. A method comprising:

generating electrons;

directing electrons in a beam through an electron entrance aperture of an ionization chamber, wherein a magnetic field is arranged to confine electrons in the beam being directed through the electron entrance aperture;

dispersing the electrons within the ionization chamber with an electron dispersive mechanism, the electron dispersive mechanism including a magnetic shielding configured to reduce the magnetic fields within at least a portion of the ionization chamber;

producing ions within the ionization chamber; and directing the ions as a beam through the ion exit aperture.

7. The method of claim 6 wherein producing ions within the ionization chamber includes producing ions by chemical ionization.

* * * * *